United States Patent
Altammar

(10) Patent No.: US 11,952,062 B1
(45) Date of Patent: Apr. 9, 2024

(54) TREE CLIMBING ROBOT

(71) Applicant: KING FAISAL UNIVERSITY, Al-Ahsa (SA)

(72) Inventor: Hussain Altammar, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/131,959

(22) Filed: Apr. 7, 2023

(51) Int. Cl.
- B25J 11/00 (2006.01)
- B25J 5/00 (2006.01)
- B25J 9/16 (2006.01)
- B62D 55/075 (2006.01)

(52) U.S. Cl.
CPC ............ B62D 55/075 (2013.01); B25J 5/005 (2013.01); B25J 9/1689 (2013.01)

(58) Field of Classification Search
CPC ...... B25J 9/0009; B25J 11/008; B25J 19/021; B25J 5/02; B25J 13/006; B66B 9/187; B66B 9/02; B66B 9/00; A01G 3/08; A01G 23/0955; A01G 7/06; F03D 80/50
See application file for complete search history.

(56) References Cited

U.S. PATENT DOCUMENTS

| | | | | |
|---|---|---|---|---|
| 3,533,458 A | * | 10/1970 | Mccoll | A01G 23/085 144/337 |
| 3,545,509 A | * | 12/1970 | Baxter, Jr. | A01G 23/0955 30/379 |
| 4,269,241 A | * | 5/1981 | Hickman | A01G 3/08 144/34.1 |
| 5,351,783 A | * | 10/1994 | Celli | B66B 9/02 182/141 |
| 7,076,335 B2 | * | 7/2006 | Seemann | B62D 57/00 901/1 |

(Continued)

FOREIGN PATENT DOCUMENTS

| | | |
|---|---|---|
| CN | 104058019 B | 5/2017 |
| CN | 210113822 U | 2/2020 |

(Continued)

OTHER PUBLICATIONS

Ren et al., Study on a Novel Wheel Type Tree-Climbing Robot, 2014, IEEE, p. 130-153 (Year: 2014).*

(Continued)

*Primary Examiner* — Mcdieunel Marc
(74) *Attorney, Agent, or Firm* — Nath, Goldberg & Meyer; Richard C. Litman

(57) ABSTRACT

The tree climbing robot includes a central body and a pair of track carriers respectively pivotally attached to opposed sides of the central body. A set of wheels is rotatably attached to each of the track carriers, and a continuous track is mounted on, and is driven to rotate by, each set of wheels. At least one motor is mounted on each of the track carriers, such that each motor drives a corresponding one of the sets of wheels and a corresponding one of the continuous tracks to rotate. At least one cable is secured to the central body and is adapted for wrapping around a trunk of a tree. Each of the track carriers is elastically biased with respect to the central body such that the trunk of the tree is clamped between the pair of tracks, with the cable adding securement, stability, and aiding vertical movement.

20 Claims, 5 Drawing Sheets

(56) References Cited

U.S. PATENT DOCUMENTS

| | | | | |
|---|---|---|---|---|
| 7,997,311 | B2* | 8/2011 | Prout, Jr. | A01G 7/06 144/208.2 |
| 8,517,066 | B1* | 8/2013 | Van De Mortel | B27L 1/06 144/24.13 |
| 9,370,142 | B2* | 6/2016 | Barnhill | B25J 9/0009 |
| 10,485,171 | B1* | 11/2019 | Mekhtiche | A01D 46/22 |
| 10,486,302 | B2* | 11/2019 | Hayden | B25J 5/00 |
| 2008/0105491 | A1* | 5/2008 | Prout | A01G 7/06 182/133 |
| 2014/0060701 | A1* | 3/2014 | Van De Mortel | B27L 1/06 144/343 |

FOREIGN PATENT DOCUMENTS

| | | |
|---|---|---|
| CN | 113650696 A | 11/2021 |
| CN | 113748865 A | 12/2021 |
| CN | 215912626 U | 3/2022 |

OTHER PUBLICATIONS

Gui et al., Anti-falling tree climbing mechanism optimization, 2017, IEEE, p. 284-288 (Year: 2017).*
Gui et al., A novel design of anti-falling mechanism for tree pruning robot, 2015, IEEE, p. 812-816 (Year: 2015).*
Megalingam et al., Amaran: An Unmanned Robotic Coconut Tree Climber and Harvester, 2021, IEEE, p. 288-299 (Year: 2021).*
Lam et al., A Flexible Tree Climbing Robot: Treebot—Design and Implementation, 2011, IEEE, p. 5849-5854 (Year: 2011).*
Narayanan et al., Autonomous tree climbing robot (Treebot), 2013, IEEE, p. 1-5 (Year: 2013).*
Zhou et al., Advances in Climbing Robots, 2015, IEEE, p. 737-766 (Year: 2015).*

* cited by examiner

TREE CLIMBING ROBOT

BACKGROUND OF THE INVENTION

Field of the Invention

The disclosure of the present patent application relates to automating agricultural tasks, such as the pollination, sacking, harvesting and cleaning of date palm trees, for example, and particularly to an autonomous or semi-autonomous robot for performing such tasks.

Description of Related Art

Growing and tending to fruit trees requires a large amount and variety of manual labor. For example, date palm tree growers regularly perform pollination, sacking, harvesting and cleaning of the trees. Each of these tasks requires a laborer to climb the tree, carrying a variety of tools, and perform the necessary tasks. Because date palm trees do not have low branches, the act of climbing is extremely difficult and even once the laborer reaches the top of the tree, performing the necessary tasks while also maintaining a grip on the tree trunk is not only difficult but dangerous. Although various types of hoists, arrangements of cables and the like have been used in the past to assist the laborer in climbing and maintaining position on the tree, such devices only minimally affect the risk, labor and time required to accomplish the agricultural tasks. Thus, a tree climbing robot solving the aforementioned problems is desired.

SUMMARY OF THE INVENTION

The tree climbing robot is an autonomous or semi-autonomous device for vertically climbing a tree, such as a date palm tree as a non-limiting example, and is further provided with a robotic arm for performing agricultural tasks, such as pollination, sacking, harvesting and cleaning, as non-limiting examples. The tree climbing robot includes a central body and a pair of track carriers respectively pivotally attached to opposed sides of the central body. A set of wheels is rotatably attached to each of the track carriers, and a continuous track is mounted on, and is driven to rotate by, each set of wheels.

At least one motor is mounted on each track carrier, such that each motor drives a corresponding one of the sets of wheels and a corresponding one of the continuous tracks to rotate. At least one cable is secured to the central body and is adapted for wrapping around a trunk of a tree. Each of the track carriers is elastically biased with respect to the central body such that the trunk of the tree can be clamped between the pair of tracks, with at least one cable adding further securement and stability, as well as aiding in the vertical movement of the tree climbing robot.

First and second cables may be provided, with one end of each of the first and second cables being angularly adjustable with respect to the central body. First and second cable winding motors may each be coupled to opposite ends of the first and second cables, respectively, for selectively tightening and loosening each of the first and second cables with respect to the trunk of the tree. First and second cable rotating motors may be used for selectively angularly adjusting the ends of the first and second cables with respect to the central body.

These and other features of the present subject matter will become readily apparent upon further review of the following specification.

BRIEF DESCRIPTION OF DRAWINGS

Similar reference characters denote corresponding features consistently throughout the attached drawings.

DETAILED DESCRIPTION

Figure 1:
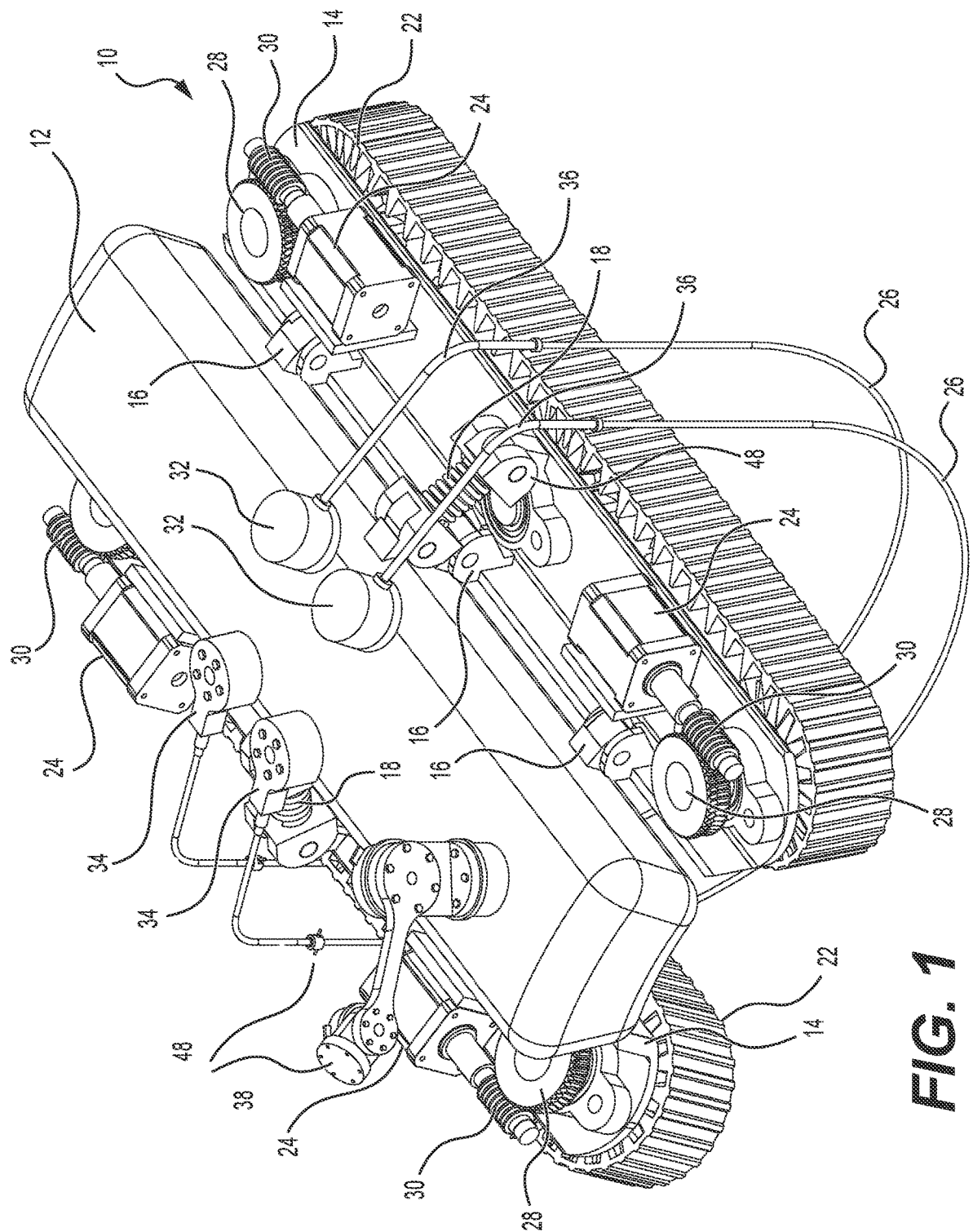
FIG. 1 is a perspective view of a tree climbing robot.
Figure 2:
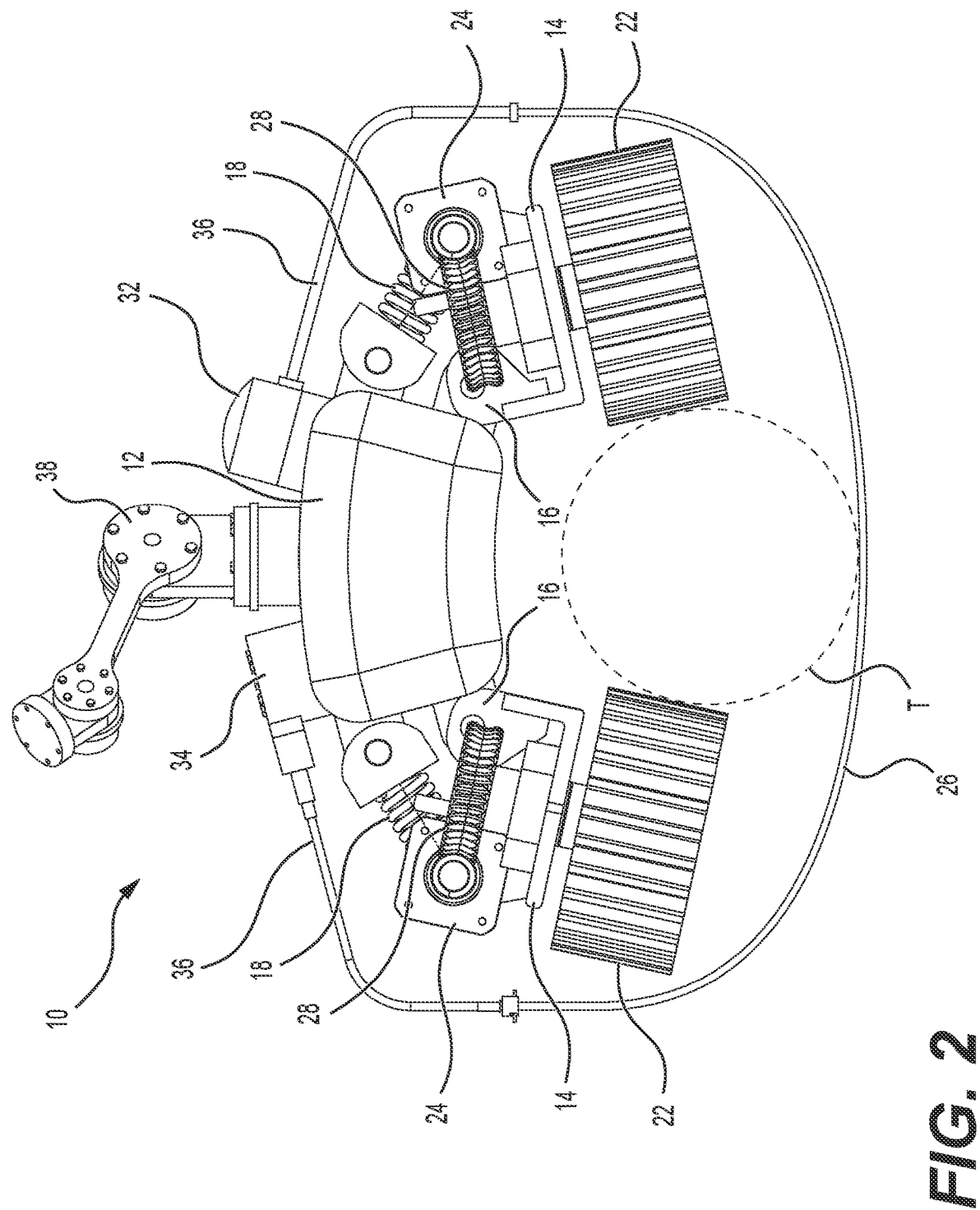
FIG. 2 is a top environmental view of the tree climbing robot.
Figure 3:
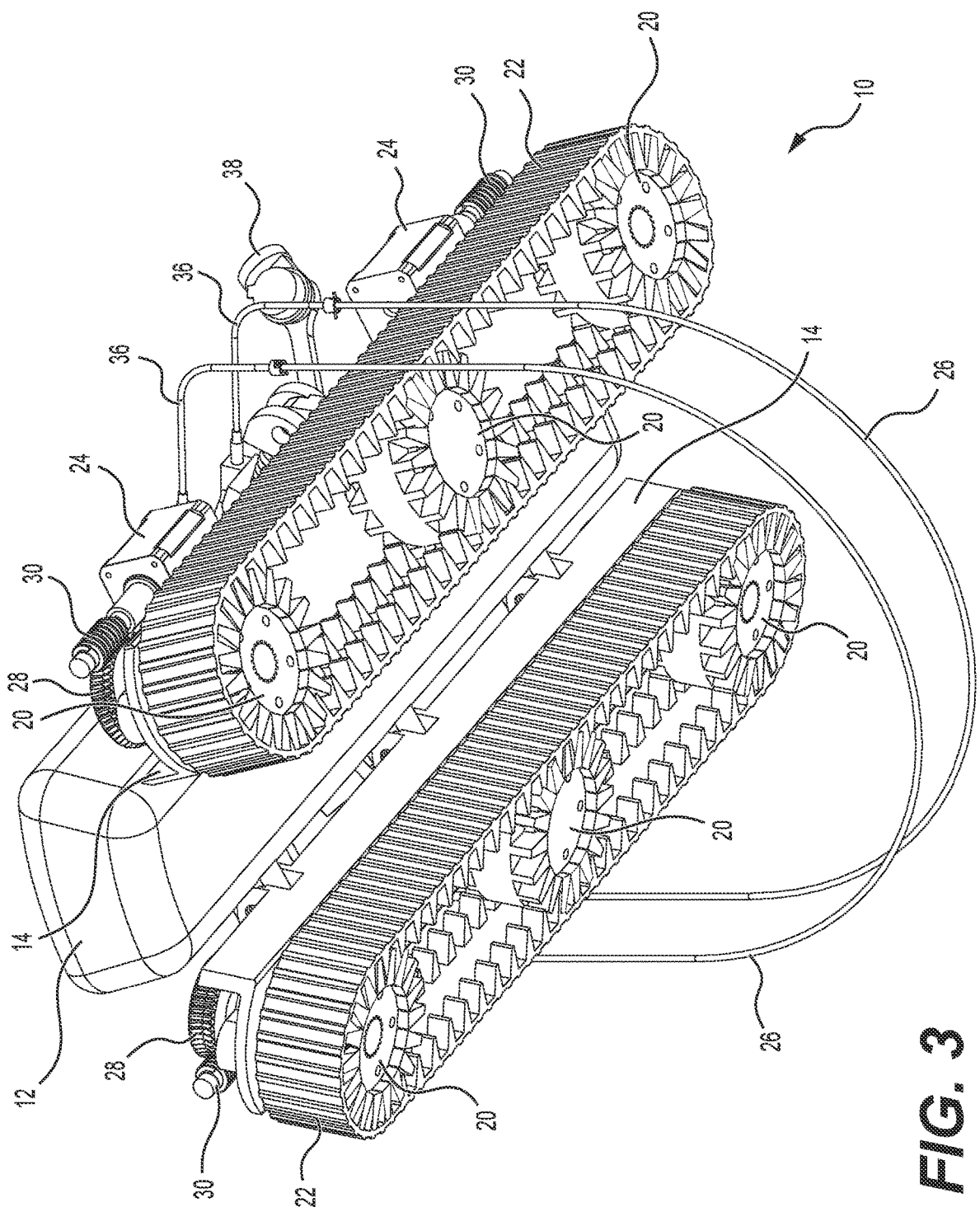
FIG. 3 is a bottom perspective view of the tree climbing robot.

The tree climbing robot 10 is an autonomous or semi-autonomous device for vertically climbing a tree T, such as a date palm tree as a non-limiting example, and is further provided with a robotic arm 38 for performing agricultural tasks, such as pollination, sacking, harvesting and cleaning, as non-limiting examples. As shown in FIGS. 1-3, the tree climbing robot 10 includes a central body 12 and a pair of track carriers 14 respectively pivotally attached to opposed sides of the central body 12. In FIG. 1, each track carrier 14 is shown pivotally attached to the central body 12 by three pivotal joints 16. However, it should be understood that pivotal joints 16 are shown for exemplary purposes only, and that any suitable type of pivotal or hinged attachment may be used. Similarly, any suitable number of pivotal joints or the like may be used to attach each track carrier 14 to the central body 12. Further, it should be understood that the overall configuration of tree climbing robot 10, including the shape and relative dimensions of central body 12 and track carriers 14, is shown for exemplary purposes only.

As best seen in FIG. 3, a set of wheels 20 is rotatably attached to each of the track carriers 14, and a continuous track 22 is mounted on, and is driven to rotate by, each set of wheels 20. In the non-limiting example of FIG. 3, each track carrier 14 carries three wheels 20, however, it should be understood that the three wheels 20 shown in each set are shown for exemplary purposes only, and that each track carrier 14 may carry any suitable number of wheels 20. Further, although wheels 20 are shown as being toothed wheels for engaging corresponding inner teeth on continuous tracks 22, it should be understood that wheels 20 may be any suitable type of wheels and that continuous tracks 22 may have any suitable type of inner surface for contacting, and being driven to rotate by, wheels 20. It should be further understood that the tread on the outer surface of each of continuous tracks 22 is shown for exemplary purposes only, and that any suitable tread for gripping a tree trunk may be used.

At least a pair of motors 24 are respectively mounted on the pair of track carriers 14, such that each motor 24 drives a corresponding one of the sets of wheels 20 and a corresponding one of the continuous tracks 22 to rotate. In the non-limiting example shown in FIGS. 1 and 3, each track carrier 14 carriers two motors 24 which are coupled to two corresponding wheels 20. In this non-limiting example, each set of wheels 20 includes three wheels, with the two corresponding motors 24 being respectively coupled to the outermost wheels 20, and with the central wheel 20 being driven to rotate solely by its engagement with the corresponding continuous track 22. However, it should be understood that this arrangement is shown for exemplary purposes only, and that any suitable number of motors 24 may be provided for direct coupling to a corresponding number of wheels 20, including, but not limited to, only a single motor 24 provided for each set of wheels 20, or multiple motors 24 directly coupled to all of the wheels 20 in the set. Additionally, in the non-limiting example of FIGS. 1-3, each of the motors 24 is shown as being coupled to a respective one of the wheels 20 by a corresponding worm drive, including a worm wheel 28 and a worm shaft 30. However, it should be understood that any suitable type of coupling between the motors 24 and the wheels 20 may be used for driving the wheels 20 to rotate.

At least one cable 26 is secured to the central body 12 and is adapted for wrapping around a trunk of a tree T, as shown in FIG. 2. In the non-limiting examples of FIGS. 1 and 2, two such cables 26 are provided, however, it should be understood that any suitable number of cables 26 may be used. Each of the track carriers 14 is elastically biased with respect to the central body 12 by a corresponding compressed spring 18 or the like, such that the trunk of the tree T can be clamped between the pair of tracks 22, as shown in FIG. 2, with the cables 26 adding further securement and stability. Further, each of the cables 26 may have an adjustable length, allowing the cables 26 to be tightened or loosened around the trunk of the tree T, as will be discussed in greater detail below.

As best seen in FIG. 1, for each cable 26, a cable winding motor 32 may be mounted on the central body 12 and be coupled to one end of the cable 26 for selectively tightening and loosening the cable 26 with respect to the trunk of the tree. As will be described in further detail below, a corresponding cable rotating motor 34 may also be mounted on the central body 12 and be coupled to an opposed end of the cable 26 for rotating the opposed end of the cable 26 with respect to central body 12. As shown in FIGS. 1 and 2, the ends of each cable 26 may pass through corresponding support tubes 36, each of which extends beyond the width of continuous tracks 22 to prevent the cables 26 from interfering with the movement of continuous tracks 22. The support tubes 36 connected to the cable rotating motors 34 also assist in implementing rotation of the cables 26.

As best seen in FIG. 1, a robotic arm 38 may be mounted on the central body 12 for performing various tasks, including, but not limited to, pollination, sacking, harvesting and cleaning of the tree T. It should be understood that robotic arm 38 may be any suitable type of robotic arm, as is well-known in the art, including or incorporating any suitable type of tools or manipulators which may be required for performing the desired agricultural tasks. Although robotic arm 38 is shown with a four-bar linkage with three degrees of freedom, it should be understood that this design is shown for exemplary purposes only, and that any suitable type of robotic arm, controllable manipulator, controllable actuator or set of actuators, or the like may be used.

Figure 5:
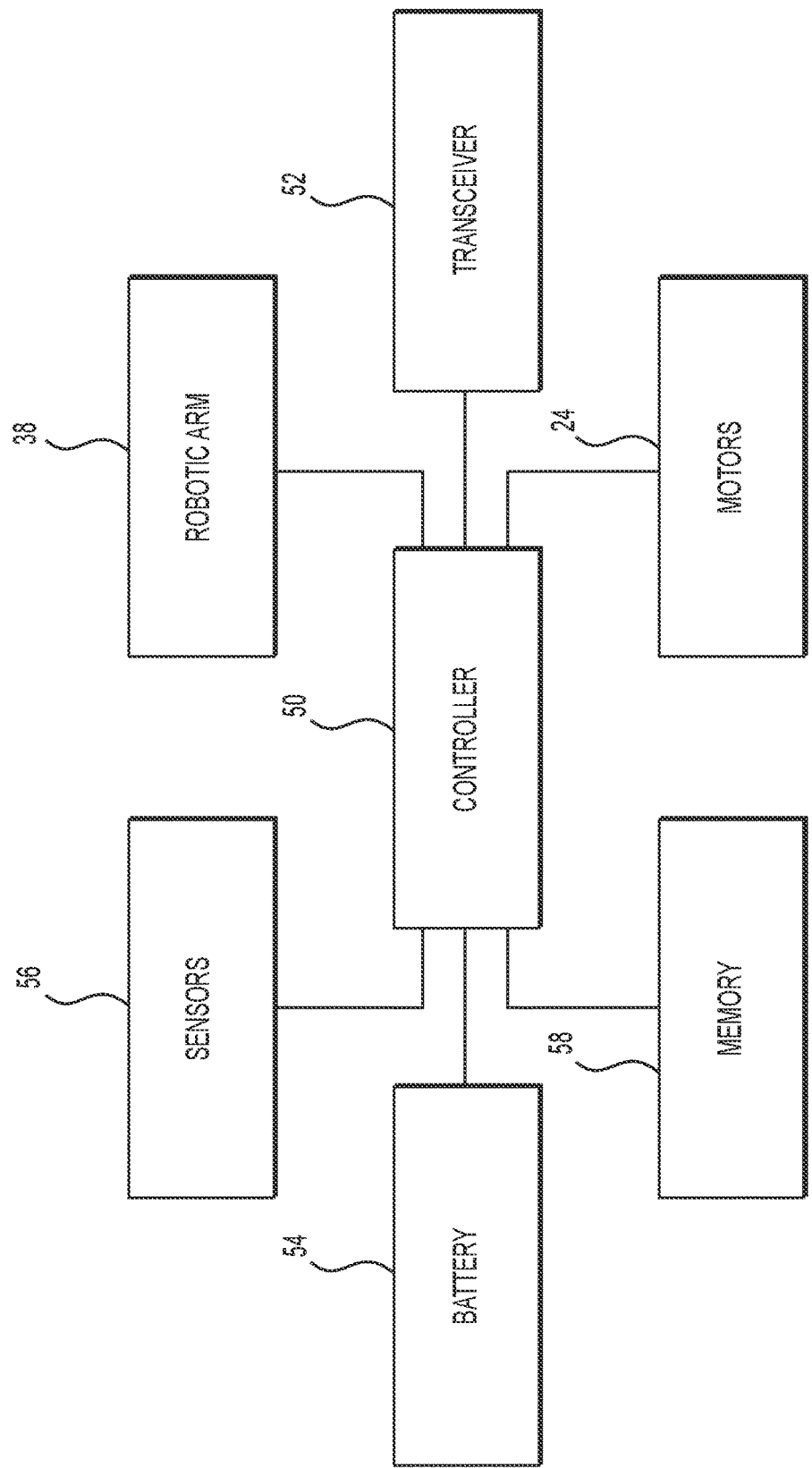
FIG. 5 is a block diagram illustrating system components of the tree climbing robot.

As illustrated in FIG. 5, the central body 12 may carry a controller 50 for operating robotic arm 38 and for controlling motors 24 to drive the tree climbing robot 10 up and down the trunk of the tree T. An on-board power source, such as a battery 54 or the like, may be used to provide power to controller 50, robotic arm 38 and motors 24. It should be understood that any suitable source of power may be used, such as one or more rechargeable batteries, solar power or the like. It should be further understood that controller 50 may be any suitable type of controller, including, but not limited to, a processor, control circuitry, a programmable logic controller or the like. Controller 50 may be in communication with, or incorporate, memory 58, which may be any suitable type of non-transitory, computer-readable memory, allowing controller 50 to be pre-programmed for autonomous or semi-autonomous operation. Further, controller 50 may be in communication with, or incorporate, a transceiver 52, such as a wireless transceiver or the like, allowing controller 50 to receive remote programming and/or command signals.

Figure 4:
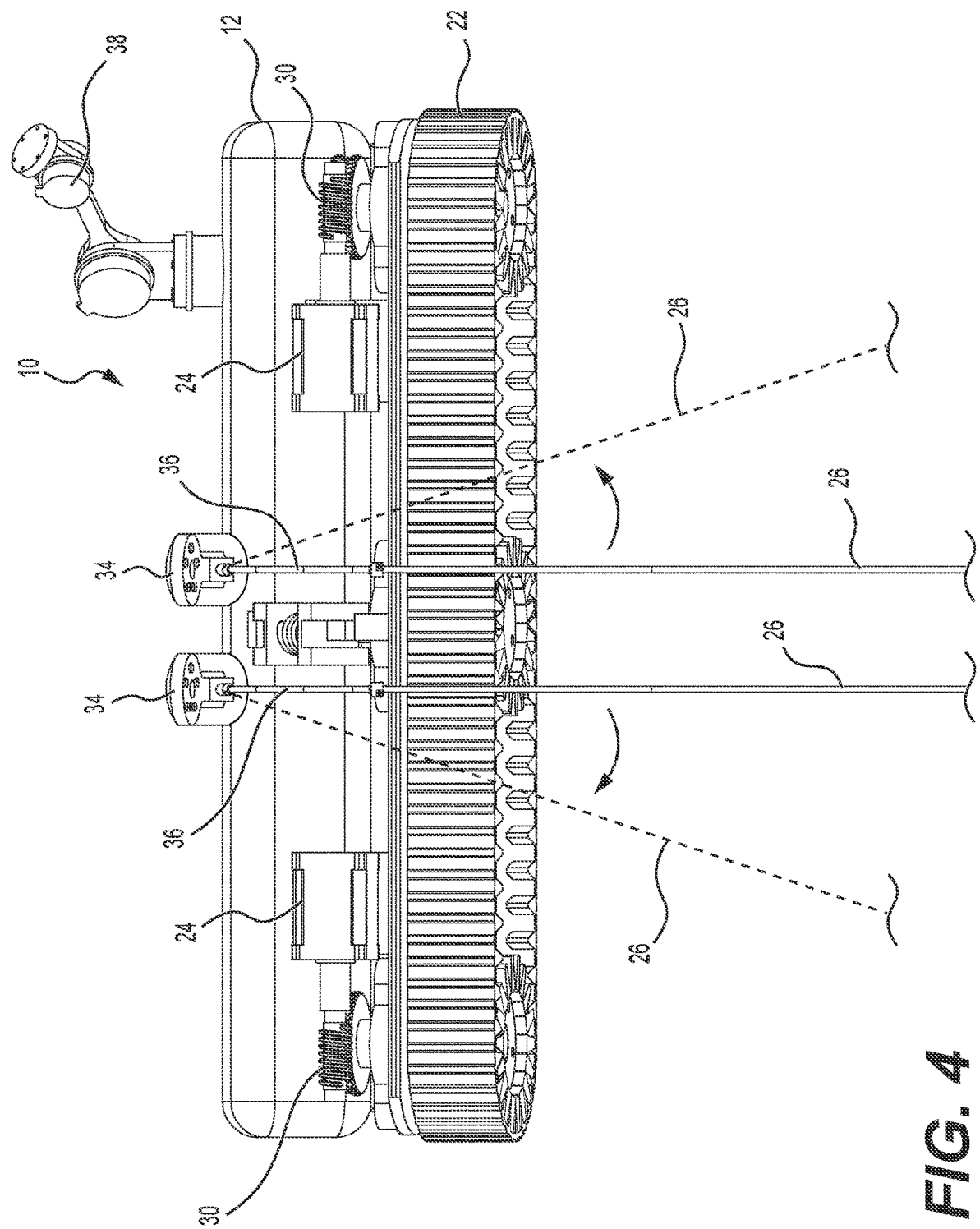
FIG. 4 is a side view of the tree climbing robot.

In operation, the tree climbing robot 10 is placed against the trunk of the tree T such that the pair of continuous tracks 22 are pressed against the trunk, as shown in FIG. 2. The cables 26 are adjusted to wrap tightly around the trunk of the tree T and may be locked in place using, as a non-limiting example, the bayonet locks 48 shown in FIG. 1. In the non-limiting example of FIGS. 1 and 3, where two cables 26 are used, the lowermost (with respect to vertical placement on the trunk) cable winding motor 32 may be actuated to tighten the grip of the lowermost cable 26, thus pulling the robot 10 towards the trunk. At this stage, both cables 26 are horizontal (with respect to the ground) and the robot 10 is in a locked position with respect to the trunk of tree T, held in place by both cables 26 and the elastic biasing on track carriers 14. At this stage, the uppermost cable 26 has no tension and is still horizontal. The uppermost cable rotating motor 34 then rotates the uppermost cable 26 (via the corresponding solid link) upward, as shown in FIG. 4. The lower cable winding motor 32 then loosens the lowermost cable 26 just enough so that the tree climbing robot 10 is free to climb up the trunk of tree T. The robot 10 climbs vertically on the trunk until the uppermost cable 26 is horizontal again.

As indicated in FIG. 4, the lowermost cable at this stage is angled downwards. The determination of the angles with respect to the horizontal may be accomplished by any suitable type of angle-measuring sensor, which may be incorporated into a set of sensors 56 in communication with controller 50. The uppermost cable winding motor 32 tightens the uppermost horizontal cable 26, and the lowermost cable rotating motor 34 returns the lowermost cable 26 to the horizontal position. To proceed, the lowermost cable winding motor 32 tightens the lowermost cable 26 against the trunk while, at the same time, the uppermost cable winding motor 32 loosens the uppermost cable 26. The uppermost cable 26 is then angled upward again and the tension on the lowermost cable 26 is again relieved, allowing the robot 10 to continue climbing. This cycle continues until the robot reaches the top of the tree.

Determination of the robot's location may be made using any suitable type of sensors 56, such as ultrasound sensors or the like, allowing the robot 10 to determine its height, the location of the top of the tree, etc. Sensors 56 may also include a camera or the like, allowing a remote operator to manually operate the robotic arm 38 to perform tasks requiring visual orientation and feedback. Sensors 56, as a further non-limiting example, may also include load cells or the like for measuring the tension in cables 26.

It is to be understood that the tree climbing robot is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

The invention claimed is:

1. A tree climbing robot, comprising:
   a central body;
   a pair of track carriers respectively pivotally attached to opposed sides of the central body, wherein each of the track carriers is elastically biased with respect to the central body;
   a pair of sets of wheels, wherein each of the sets of wheels is rotatably attached to a corresponding one of the pair of track carriers;
   a pair of continuous tracks, wherein each of the continuous tracks is mounted on and is driven to rotate by a corresponding one of the sets of wheels;
   a pair of motors respectively mounted on the pair of track carriers, wherein each of the motors drives a corresponding one of the sets of wheels and a corresponding one of the continuous tracks to rotate; and
   a cable secured to the central body and adapted for wrapping around a trunk of a tree, wherein the cable when wrapped around the trunk of the tree is used to provide additional support and securement to the central body against the trunk of the tree.

2. The tree climbing robot as recited in claim 1, wherein each of the motors is coupled to a respective one of the wheels by a worm drive.

3. The tree climbing robot as recited in claim 1, wherein the cable has an adjustable length.

4. The tree climbing robot as recited in claim 3, further comprising a cable winding motor coupled to one end of the cable for selectively tightening the cable around the trunk of the tree.

5. The tree climbing robot as recited in claim 4, further comprising a cable rotating motor coupled to an opposed end of the cable for selectively rotating the opposed end of the cable with respect to the central body.

6. The tree climbing robot as recited in claim 1, further comprising a robotic arm mounted on the central body.

7. The tree climbing robot as recited in claim 6, further comprising a controller in communication with the pair of motors and the robotic arm.

8. The tree climbing robot as recited in claim 7, further comprising a transceiver in communication with the controller for receiving remote command signals.

9. A tree climbing robot, comprising:
   a central body;
   a pair of track carriers respectively pivotally attached to opposed sides of the central body, wherein each of the track carriers is elastically biased with respect to the central body;
   a pair of sets of wheels, wherein each of the sets of wheels is rotatably attached to a corresponding one of the pair of track carriers;
   a pair of continuous tracks, wherein each of the continuous tracks is mounted on and is driven to rotate by a corresponding one of the sets of wheels;
   a pair of motors respectively mounted on the pair of track carriers, wherein each of the motors drives a corresponding one of the sets of wheels and a corresponding one of the continuous tracks to rotate; and
   first and second cables secured to the central body and adapted for wrapping around a trunk of a tree, wherein one end of each of the first and second cables is angularly adjustable, and wherein the first and second cable when wrapped around the trunk of the tree are used to provide additional support and securement to the central body against the trunk of the tree.

10. The tree climbing robot as recited in claim 9, wherein each of the motors is coupled to a respective one of the wheels by a worm drive.

11. The tree climbing robot as recited in claim 9, wherein each of the first and second cables has an adjustable length.

12. The tree climbing robot as recited in claim 11, further comprising first and second cable winding motors each coupled to one end of the first and second cables, respectively, for selectively tightening each of the first and second cables around the trunk of the tree.

13. The tree climbing robot as recited in claim 12, further comprising first and second cable rotating motors coupled to opposed ends of the first and second cables, respectively, for selectively rotating the opposed ends of the first and second cables with respect to the central body.

14. The tree climbing robot as recited in claim 9, further comprising a robotic arm mounted on the central body.

15. The tree climbing robot as recited in claim 14, further comprising a controller in communication with the pair of motors and the robotic arm.

16. The tree climbing robot as recited in claim 15, further comprising a transceiver in communication with the controller for receiving remote command signals.

17. A tree climbing robot, comprising:
   a central body;
   a pair of track carriers respectively pivotally attached to opposed sides of the central body, wherein each of the track carriers is elastically biased with respect to the central body;
   a pair of sets of wheels, wherein each of the sets of wheels is rotatably attached to a corresponding one of the pair of track carriers;
   a pair of continuous tracks, wherein each of the continuous tracks is mounted on and is driven to rotate by a corresponding one of the sets of wheels;
   a pair of motors respectively mounted on the pair of track carriers, wherein each of the motors drives a corresponding one of the sets of wheels and a corresponding one of the continuous tracks to rotate;
   first and second cables secured to the central body and adapted for wrapping around a trunk of a tree, wherein one end of each of the first and second cables is angularly adjustable, and wherein the first and second cable when wrapped around the trunk of the tree are used to provide additional support and securement for the central body against the trunk of the tree;
   first and second cable winding motors each coupled to one end of the first and second cables, respectively, for selectively tightening each of the first and second cables around the trunk of the tree; and
   first and second cable rotating motors coupled to opposed ends of the first and second cables, respectively, for selectively rotating the opposed ends of the first and second cables with respect to the central body.

18. The tree climbing robot as recited in claim 17, wherein each of the motors is coupled to a respective one of the wheels by a worm drive.

19. The tree climbing robot as recited in claim 17, further comprising a robotic arm mounted on the central body.

20. The tree climbing robot as recited in claim 19, further comprising a controller in communication with the pair of motors and the robotic arm, emerge, to effectuate formation.

* * * * *